United States Patent
Nalwa

Patent Number: 5,793,527
Date of Patent: *Aug. 11, 1998

[54] HIGH RESOLUTION VIEWING SYSTEM

[75] Inventor: Vishvjit Singh Nalwa, Middletown, N.J.

[73] Assignee: Lucent Technologies Inc., Murray Hill, N.J.

[*] Notice: The term of this patent shall not extend beyond the expiration date of Pat. No. 5,539,483.

[21] Appl. No.: 497,673

[22] Filed: Jun. 30, 1995

[51] Int. Cl.$^6$ .......................... G02B 23/08; G02B 13/06
[52] U.S. Cl. .................. 359/403; 359/363; 359/725; 348/36; 353/94
[58] Field of Search .................. 359/363, 367, 359/399–403, 406, 429, 431, 503–506, 515, 527, 546, 618, 627, 633, 831, 833–836, 850–851, 879; 348/36–39; 353/30, 37, 94, 98–99; 352/69–71

[56] References Cited

U.S. PATENT DOCUMENTS

| | | | |
|---|---|---|---|
| 4,890,314 | 12/1989 | Judd et al. | 348/14 |
| 4,982,092 | 1/1991 | Jehle | 352/69 |
| 5,016,109 | 5/1991 | Gaylord | 348/218 |
| 5,030,823 | 7/1991 | Obdeijn | 250/223 B |
| 5,194,959 | 3/1993 | Kaneko et al. | 250/226 |
| 5,305,029 | 4/1994 | Yoshida et al. | 353/37 |
| 5,539,483 | 7/1996 | Nalwa | 353/94 |

FOREIGN PATENT DOCUMENTS

| | | |
|---|---|---|
| 484801 | 5/1992 | European Pat. Off. . |
| 519774 | 12/1992 | European Pat. Off. . |
| 3739697 | 12/1988 | Germany . |
| 20692 | 2/1985 | Japan ............ 348/36 |
| WO25927 | 12/1993 | WIPO . |

*Primary Examiner*—Thong Nguyen
*Attorney, Agent, or Firm*—Christopher N. Malvone

[57] ABSTRACT

A pyramid shaped group of reflective surfaces segment a field of view. Each of the reflective surfaces of the pyramid provides a segment of the field of view to a lens which focuses the segment onto a sensor. The pyramid shaped collection of reflective surfaces provide each of the sensors with a common center of projection. This avoids distortions that may result from using sensors with differing centers of projection. The sensors provide an electronic representation of the image for storage or other uses. The sensor used to receive each segment may have a low resolution, but since the low resolution sensor is only capturing a segment of the image, the overall effect is to capture the entire image at a high resolution.

5 Claims, 2 Drawing Sheets

HIGH RESOLUTION VIEWING SYSTEM

CROSS REFERENCE TO RELATED INVENTION

This application is related to commonly assigned U.S. patent applications entitled "Method And System For Panoramic Viewing", Ser. No. 08/431,354 and "Panoramic Viewing Apparatus", Ser. No. 08/431,356.

BACKGROUND OF THE INVENTION

1. Field of the invention

The present invention relates to a viewing system; more particularly, a high resolution viewing system.

2. Description of the Related Art

In the past, high resolution systems for capturing or projecting an image involved using sensors or displays having a high resolution. For example, capturing an image using high resolution involves using a charge coupled device (CCD) having a sensor array of 1024 by 1024. The price of such sensors is relatively expensive in comparison to lower resolution devices such as a device with a 512 by 512 array. As a result, it is desirable to obtain high resolution images using relatively low resolution sensor arrays. Similarly, it is also desirable to project high resolution images using relatively low resolution displays such as low resolution liquid crystal displays (LCD).

SUMMARY OF THE INVENTION

One embodiment of the present invention provides a pyramid shaped group of reflective surfaces that segment a field of view. Each of the reflective surfaces of the pyramid provide a segment of a view to a lens which focuses the image segment onto a sensor, which provides an electronic representation of the image for storage or other uses. The pyramid shaped collection of reflective surfaces provide each of the sensors with a common center of projection. This avoids distortions that may result from using sensors with differing centers of projection. The sensor used to receive each segment may have a low resolution, but since the low resolution sensor is capturing only a segment of the image, the overall effect is to capture the entire image at a high resolution.

In another embodiment of the present invention projection devices provide segments of an image through a lenses to a pyramid shaped group of reflective surfaces. The reflective surfaces direct the image segments to a field of view where the image segments are seen as one high resolution image. The projector used to provide each image segment to a reflective surface may have a low resolution, but since the low resolution projector is only producing a segment of the image, the overall effect is to provide the entire image at a high resolution.

DETAILED DESCRIPTION OF THE INVENTION

Figure 1:
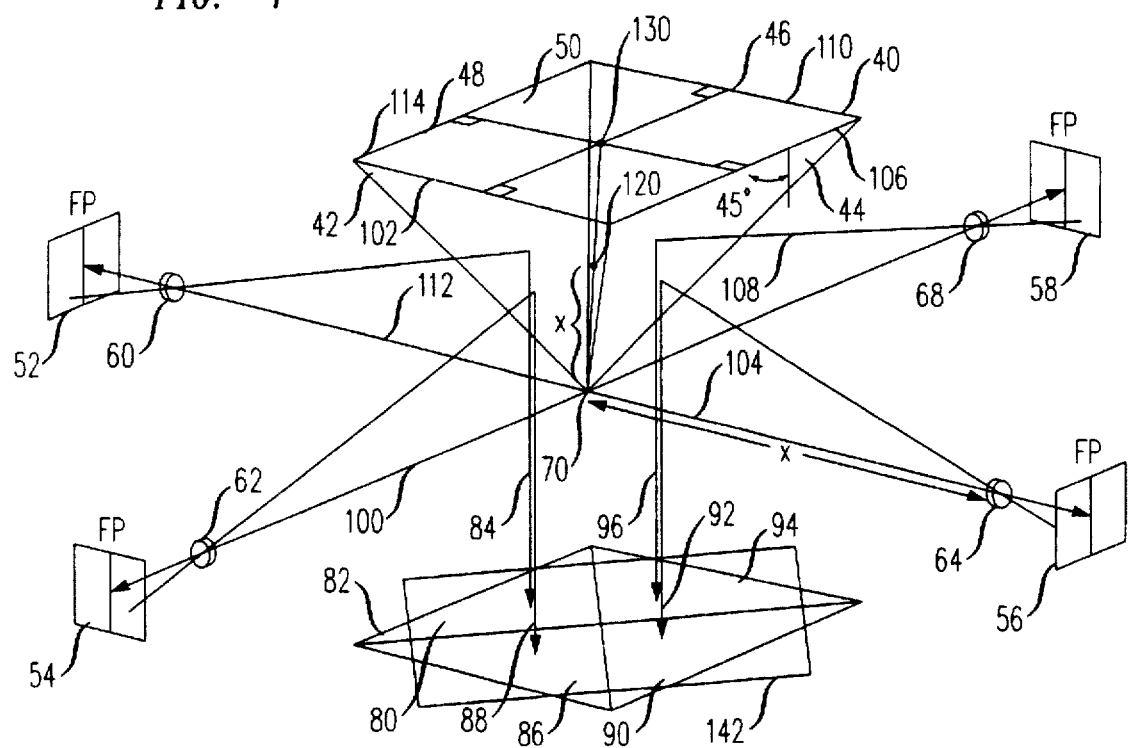
FIG. 1 illustrates the relationship between a segmented field of view, a pyramid shaped reflective surface and lenses and focal planes of image processing devices.

FIG. 1 illustrates a four image processor system for segmenting or projecting an image. The image processor may include a lens and an image capture device such as a camera, or it may include a lens and an image display device such as an LCD. When capturing and segmenting an image, a sensor such as a charge coupled device is placed at each of focal planes 52, 54, 56 and 58, and in the case of projecting an image that was initially segmented, a display device such as a LCD, or film is positioned at each of focal planes 52, 54, 56 and 58.

Pyramid 40 has reflective sides 42, 44, 46 and 48. In a preferred embodiment, the reflective sides form a 45 degree angle with a plane parallel to base 50 and passing through the vertex of pyramid 40. Sensors or display devices positioned at focal planes 52, 54, 56 and 58 are associated with pyramid reflective surfaces 48, 42, 44, and 46, respectively. Lenses 60, 62, 64 and 68 produce an image at or project an image from focal planes 52, 54, 56 and 58, respectively. The sensors may be image gathering devices such as an optical scanner or CCD, and the display device may be film, a LCD panel, or an electronic display panel such as a LED (light emitting diode) panel. The following discussion will be in terms of capturing an image but it also applies to producing an image with display devices at focal planes 52, 54, 56 and 58. As a result, focal plane 52 views a reflection from surface 48 to enable it to view segment 80 of field of view 82 in the direction of arrow 84. Focal plane 54 views a reflection from surface 42 to view image segment 86 in the direction of arrow 88. Focal plane 56 views a reflection from surface 44 to view image segment 90 in the direction of arrow 92, and focal plane 58 views a reflection from surface 46 to view image segment 94 in the direction of arrow 96.

It is desirable to locate the center of projection or optical center of each lens in a plane that is parallel to base 50 and intersects vertex 70 of pyramid 40. In addition, each lens' center of projection should also be located on a line that passes through vertex 70 and is perpendicular to the base line of the focal plane's associated reflective surface. For example, the lens 62's center of projection is located on line 100. Line 100 is perpendicular to base line 102 of reflective surface 42. Line 100 is in a plane that passes through vertex 70 and is parallel to base 50. Likewise, lens 64's center of projection is positioned on line 104 which is perpendicular to baseline 106, lens 68's center of projection is positioned on line 108 which is perpendicular to base line 110, and lens 60's center of projection is positioned on line 112 which is perpendicular to base line 114.

Each lens's center of projection is positioned on one of the above described lines at a distance X from vertex 70, with the optical axis of the lens along the line. (The distance X should be such that the lens captures as much of the image from the reflective surface as desired; however, the defects in the reflective surface become more visible when the lens is moved closer to the reflective surface.) This positioning of the lenses results in the lenses sharing a virtual optical center located at position 120. Virtual optical center 120 is located a distance X from the vertex 70 on a line that passes through vertex 70 and is perpendicular to base 50. As a result of sharing a virtual optical center, field of view 82 is segmented for capture without introducing distortions produced by using sensors with differing centers of projection.

Figure 2:
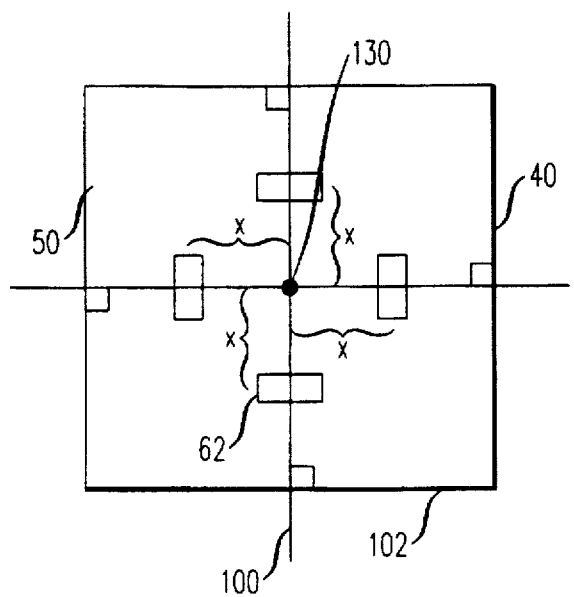
FIG. 2 is a top view of the pyramid.

FIG. 2 is a top view of pyramid 40. FIG. 2 illustrates the placement of the optical center of projection of lens 62 along line 100. Line 100 should be in a plane that passing through vertex 70 and is parallel to base 50. The line should also be perpendicular to base line 102 of pyramid 40. The lens' center of projection should be positioned a distance X from vertex 70 along line 100. The distance X should be such that the reflective surface reflects as much field of view segment 86 as desired. Point 130 is located on base 50 at a position where a line from vertex 70 perpendicularly intersects base 50. In a similar fashion, the centers of projection of lenses 64, 68 and 60 are positioned at distance X along lines 104, 108 and 112, respectively.

Figure 3:
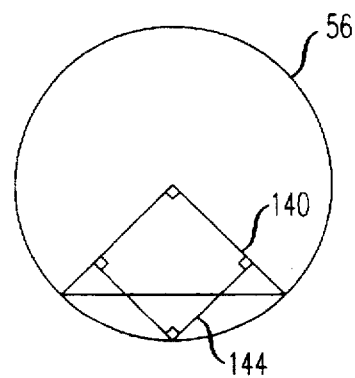
FIG. 3 illustrates an image segment formed on a focal plane.

FIG. 3 illustrates an image formed on one of the focal planes. For illustrative purposes, we will assume that FIG. 3 is an illustration of focal plane 56; however, the description is similar for the other focal planes. The image produced by lens 64 appears on focal plane 56. Only the portion of the image relating to field of view segment 90 is of interest. The image of segment 90 appears within the triangular shape 140 on focal plane 56. In order to minimize cost, it is advantageous to provide image sensing elements only within triangular area 140 when capturing an image of segment 90. In applications where an image is being projected, it is desirable to reduce cost by providing display elements only within triangular area 140.

It should be noted that it may be desirable to segment the field of view into rectangular segments rather than triangular segments. In this embodiment, the field of view indicated by rectangle 142 of FIG. 1 is captured by sensor elements arranged in rectangular shape 144 of FIG. 3.

Figure 4:
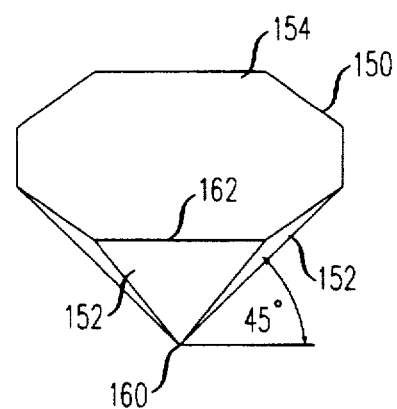
FIG. 4 illustrates an eight-sided pyramid.

FIG. 4 illustrates eight-sided pyramid 150. Pyramid 150 has reflective surfaces 152, where each of surfaces 152 forms a 45 degree angle with a plane that passes through vertex 160 and is parallel to base 154. As with the four-sided pyramid of FIG. 1, each reflective surface of FIG. 4 may have a lens, and sensor or display device associated with it. Each lens' center of projection is positioned on a line with its optical axis along the line. The line is in a plane that passes through vertex 160 and is parallel to base 154. The line is also perpendicular to base line 162 of the reflective surface associated with the lens to be positioned. Using an eight-sided pyramid offers the advantage of using lower resolution sensors or display devices, which are less expensive.

Figure 5:
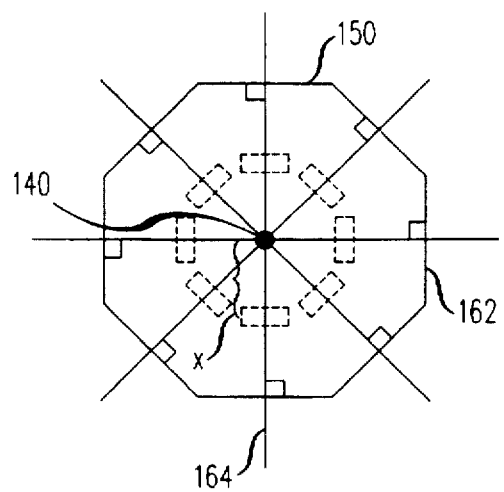
FIG. 5 is a top view of the eight-sided pyramid.

FIG. 5 is a top view of pyramid 150. As discussed with regard to FIG. 4, each lens's center of projection is positioned along a line 164 which is in a plane that passes through vertex 160 and is parallel to base 154. The center of projections are each positioned a distance X along line 164, which is perpendicular to the appropriate base line 162. Point 170 is on base 154 at the point of intersection between base 154 and a line that passes through vertex 160 and is perpendicular to base 154.

Pyramids having more or less reflective sides may be used. The advantage of using pyramids having a large number of sides is that sensors or display devices with very low resolutions may be used. Devices with low resolutions are relatively inexpensive. The number of sides used in a pyramid is somewhat limited by the cost of providing a large number of sensors or display devices, and by the cost of fabricating a pyramid with many sides.

The invention claimed is:

1. A high resolution viewing system, comprising:
   a plurality of image processing devices; and
   a pyramid shaped element having a plurality of reflective side facets, each of the plurality of reflective side facets reflecting a portion of a field of view from one direction to one of the plurality of image processing devices, and each of the image processing devices having a lens with a center of projection on a line in a plane, the plane being parallel to a base of the pyramid shaped element and containing a vertex of the pyramid shaped element, and the line being perpendicular to a base line formed by an intersection of the base and the reflective side facet providing the portion of the image to the image processing device.

2. The high resolution viewing system of claim 1, wherein the pyramid has four reflective side facets.

3. The high resolution viewing system of claim 1, wherein the pyramid has eight reflective side facets.

4. The high resolution viewing system of claim 1, wherein the image processing devices are image gathering devices.

5. The high resolution viewing system of claim 1, wherein the image processing devices are image producing devices.

* * * * *